April 21, 1931.  W. STANLEY  1,801,940
FISH BAIT
Filed Oct. 10, 1927

Inventor:
William Stanley,
by Damming & Damming
Attys.

Patented Apr. 21, 1931

1,801,940

UNITED STATES PATENT OFFICE

WILLIAM STANLEY, OF CHICAGO, ILLINOIS

FISH BAIT

Application filed October 10, 1927. Serial No. 225,149.

The bait of the present invention is designed as a surface bait adapted to float on the surface both when lying still and when being retrieved, and the object of the invention is to so configure the frontal portion of the bait that when being retrieved, it will react to variations in water pressure in such a way as to cause a life-like darting from side to side of the bait while maintaining its position at the surface and will, at the same time, cause a surface disturbance of the water which will better serve to attract and lure the fish. The bait is thus designed to resist complete submergence under the tension of the retrieving line, and to maintain itself at all times partly out of water and, at the same time, to secure a fluttering and darting effect on the surface rather than below the surface as is commonly the case in wooden plugs designed to simulate the movements of a minnow.

Further objects and details of the present bait will appear from a description thereof in conjunction with the accompanying drawings wherein—

Figure 2:
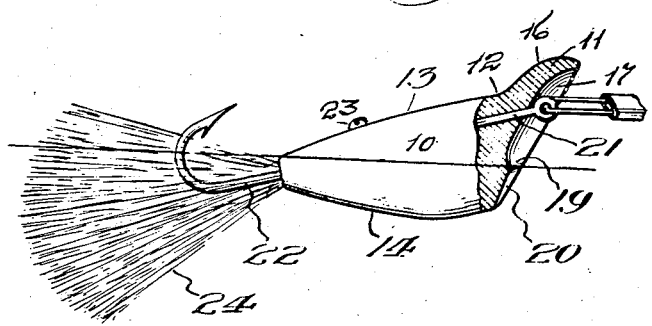
Fig. 2 is a similar view showing the position assumed by the bait while being retrieved.
Figure 3:
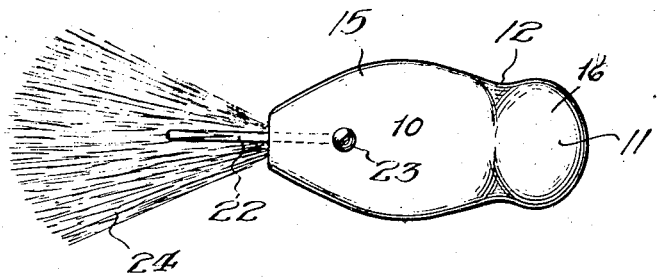
Fig. 3 is a top view of the bait.

The bait comprises a body 10, a head 11, and an intermediate neck portion 12. The body is of generally ovate formation in plan and of rearwardly tapering formation in side elevation, as indicated in Figs. 3 and 2, respectively. The upper and lower surfaces 13 and 14 of the body are of relatively flattened formation, the sides 15 of the body being rounded and merging curvedly into the top and bottom faces.

The head extends upwardly and forwardly in oblique relation to the upper face of the body and is spherically rounded on its upper surface 16 which merges curvedly into the neck portion of the bait. The underface of the head, which constitutes what may be termed the frontal structure of the bait, is provided with an obliquely disposed concavity 17 which is surrounded by a sharp rim or margin 18 which, on each side, constitutes a side lip, the purpose and function of which will hereinafter appear.

The side lips merge into a lower lip 19 which constitutes, in effect a somewhat abrupt cross ridge which merges at its side curvedly into the side lips of the frontal structure. The front of the bait below the lower lip 19 is tapered as at 20, which tapering takes the form of a shallow groove, the medial or base line of which runs obliquely at a slightly more abrupt angle than the plane of the lips or margins, so that the groove 20 progressively deepens to the point where it merges into the lower lip 19.

Figure 4:
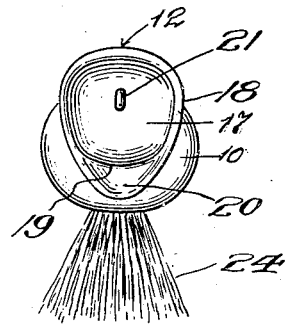
Fig. 4 is a front elevation thereof.

It will be observed by comparison of Figs. 2 and 4 that the frontal structure, as defined by the rim or margin which comprises the side lips, the top and the rim of the channel 19, presents an ovate or pear shaped appearance when viewed from the front, and that the margins all the way around lie in a single oblique plane, as viewed from the side. The neck portion, behind the head, on each side, presents the appearance of an inwardly and then outwardly curving configuration which constitutes in effect a pair of side channels for the back flow of the water escaping as the bait is retrieved.

The line tie 21 is located above the line of flotation (water line) of the bait and at a point approximately two-thirds of the distance from the bottom to the top of the frontal face of the bait. The hook 22 has its shank entered into the tapering end of the body and secured by a pin or screw 23 with the barb of the hook standing upwardly and protected by a bucktail 24, which also flares outwardly from the shank of the hook and extends to the rear thereof. The bait is preferably ballasted by a lead insert 25, indicated in dotted lines in Fig. 1.

Figure 1:
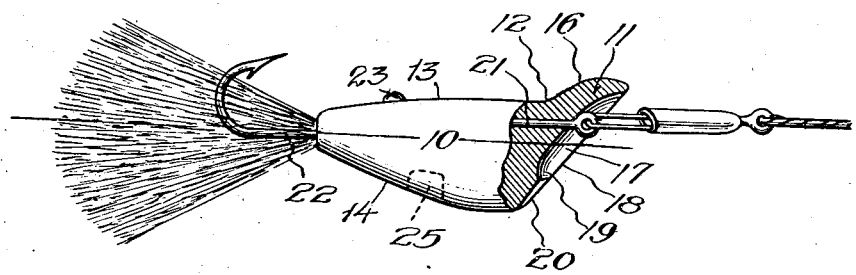
Figure 1 is an elevation, partly in section, showing the floating position occupied by the bait while at rest.

With the bait at rest, it will occupy the position indicated in Fig. 1 with the line tie slightly above the water surface, and the shank of the hook lying at about the water level. The upper surface of the body will lie in a plane substantially parallel with the water surface, and the plane of the front face will stand at an angle of approximately 45° to the water surface. In these conditions, the bucktail will be about half immersed in the water.

When the bait is being retrieved, the obliquity of the front face as a whole will tend to cause the forward end of the bait to lift, as in Fig. 2, which will tend to cause a corresponding depression of the rear end of the bait which will practically submerge the bucktail. In retrieving, the forward end of the bait will tend to lift until the lower lip 19 occupies a plane substantially at the water level.

The lower lip constitutes a cross ridge or obstruction which tends to prevent an excessive lifting of the forward end of the bait and affords, in effect, a gauge for maintaining the bait at substantially the angle indicated in Fig. 2 and prevents it from bodily jumping out of the water. At the same time, by thus gauging the lift of the forward end, the bait as a whole will be maintained at the proper retrieving angle, so that the water pressure exerted against the front of the bait will be best utilized for the purpose of causing the darting movements from side to side which constitute the characteristic actions of the present bait.

These darting movements are occasioned by variations in the water pressure exerted laterally by the escaping water against the side lips 18 which constitute the side margins of the frontal concavity. Even a slight inequality in water pressure will cause a side deflection of the bait in one direction or the other, and this will cause a side swinging movement of the bait upon the line tie as an axis which will result in a rapid darting or fluttering back and forth swinging movement of the rear end of the bait resulting in a fluttering of the bucktail and a surface disturbance of the water highly effective in the luring of game fish.

The bucktail, being flexible, will tend to stabilize the action of the rear end of the bait to the degree necessary to prevent a bodily jumping out of the bait by maintaining a sufficient "grip" on the water without, however, unduly restricting the rapid and erratic movements of the rear end of the bait from side to side which it is the purpose of the frontal structure to promote. The lower lip 19 thus co-acts with the bucktail in maintaining sufficiently stable conditions to hold the bait at the desired obliquity within the water to permit the effective action of the water in causing the darting movements referred to.

Although the lower lip lifts to about the water surface level, nevertheless the water will surge up or be crowded up into the concavity above the lower lip, so that the effective action of the water escaping past the side lips and streaming rearwardly past the neck of the bait will be maintained. The configuration is one which affords means for restraining the bait against up and down movements which would interfere with the proper surface travel of the bait, so that an effective side to side movement at the surface with a consequent surface disturbance is secured.

I claim:

1. A surface bait comprising a body portion terminating in a head partly projecting above the body portion and having a frontal formation in a plane oblique to the longitudinal axis of the bait, said frontal formation comprising a concavity affording marginal side lips and a lower cross lip disposed in a common plane, the latter affording an obstruction for regulating the elevation of the front of the bait assumed when retrieving, a hook extending rearwardly from the bait, and a line tie secured to the front of the bait at a point above the lower lip, substantially as described.

2. A surface bait comprising a body portion terminating in a head partly projecting above the body portion and having a frontal formation in a plane oblique to the longitudinal axis of the bait, said frontal formation comprising a concavity affording marginal side lips and a lower cross lip disposed in a common plane, the latter affording an obstruction for regulating the elevation of the front of the bait assumed when retrieving, a hook extending rearwardly from the bait, a line tie secured to the front of the bait at a point above the lower lip, and a flexible guard extending rearwardly from the bait and surrounding the hook and adapted in conjunction with the lower lip to stabilize the lifting action of the bait, substantially as described.

3. A surface bait comprising a body portion terminating in an obliquely forwardly extending head partly projecting above the body portion, the front of the head lying in an obliquely extending plane and comprising a frontal concavity affording marginal side lips and a cross lower lip disposed in a common plane, the latter constituting an obstruction for stabilizing the lifting effect of the water exerted against the front, the front of the bait below the lip being in the form of a rearwardly and downwardly tapering shallow groove, a hook extending rearwardly from the body of the bait, and a line tie secured to the front of the bait above the lower lip, substantially as described.

4. A surface bait comprising a body portion terminating in an obliquely forwardly extending head partly projecting above the body portion, the front of the head lying in an obliquely extending plane and comprising a frontal concavity affording marginal side lips and a cross lower lip disposed in a common plane, the latter constituting an obstruction for stabilizing the lifting effect of the water exerted against the front, a hook extending rearwardly from the body of the bait, and a line tie secured to the front of the bait above the lower lip, substantially as described.

5. A bait comprising a body portion terminating in an obliquely forwardly extending head, the front of the bait lying in an obliquely extending plane and comprising a frontal concavity affording marginal side lips and a cross lower lip, the latter constituting an obstruction for stabilizing the lifting effect of the water exerted against the front, the front of the bait below the lip being in the form of a rearwardly and downwardly tapering shallow groove, a hook extending rearwardly from the body of the bait, and a line tie secured to the front of the bait above the lower lip, the head merging into the body in a neck constituting side channels for the rearward escape of water, substantially as described.

6. A bait comprising a body portion terminating in an obliquely forwardly extending head, the front of the bait lying in an obliquely extending plane and comprising a frontal concavity affording marginal side lips and a cross lower lip, the latter constituting an obstruction for stabilizing the lifting effect of the water exerted against the front, a hook extending rearwardly from the body of the bait, and a line tie secured to the front of the bait above the lower lip, the head merging into the body in a neck constituting side channels for the rearward escape of water, substantially as described.

7. A bait comprising a body portion terminating in an obliquely forwardly extending head, the front of the bait lying in an obliquely extending plane and comprising a frontal concavity affording marginal side lips and a cross lower lip, the latter constituting an obstruction for stabilizing the lifting effect of the water exerted against the front, the front of the bait below the lip being in the form of a rearwardly and downwardly tapering shallow groove, a hook extending rearwardly from the body of the bait, a line tie secured to the front of the bait above the lower lip, and a flexible hook guard having the characteristics of a bucktail and diverging from the rear end of the bait body and co-operating with the lower lip in maintaining the proper angle of the bait while retrieving, substantially as described.

8. A bait comprising a body portion terminating in an obliquely forwardly extending head, the front of the bait lying in an obliquely extending plane and comprising a frontal concavity affording marginal side lips and a cross lower lip, the latter constituting an obstruction for stabilizing the lifting effect of the water exerted against the front, a hook extending rearwardly from the body of the bait, a line tie secured to the front of the bait above the lower lip, and a flexible hook guard having the characteristics of a bucktail and diverging from the rear end of the bait body and co-operating with the lower lip in maintaining the proper angle of the bait while retrieving, substantially as described.

9. A bait comprising a body portion terminating in an obliquely forwardly extending head, the front of the bait lying in an obliquely extending plane and comprising a frontal concavity affording marginal side lips and a cross lower lip, the latter constituting an obstruction for stabilizing the lifting effect of the water exerted against the front, the front of the bait below the lip being in the form of a rearwardly and downwardly tapering shallow groove, a hook extending rearwardly from the body of the bait, a line tie secured to the front of the bait above the lower lip, the head merging into the body in a neck constituting side channels for the rearward escape of water, and a flexible hook guard having the characteristics of a bucktail and diverging from the rear end of the bait body and co-operating with the lower lip in maintaining the proper angle of the bait while retrieving, substantially as described.

10. A bait comprising a body portion terminating in an obliquely forwardly extending head, the front of the bait lying in an obliquely extending plane and comprising a frontal concavity affording marginal side lips and a cross lower lip, the latter constituting an obstruction for stabilizing the lifting effect of the water exerted against the front, a hook extending rearwardly from the body of the bait, a line tie secured to the front of the bait above the lower lip, the head merging into the body in a neck constituting side channels for the rearward escape of water, and a flexible hook guard having the characteristics of a bucktail and diverging from the rear end of the bait body and co-operating with the lower lip in maintaining the proper angle of the bait while retrieving, substantially as described.

11. A bait comprising a body terminating at its forward end in an obliquely elevated head rounded on its upper surface, the forward portion of the head lying in a plane oblique to the longitudinal axis of the body and configured to afford a frontal concavity having a margin of pear shaped configuration, and a hook secured to the body, substantially as described.

12. A bait comprising a body terminating at its forward end in an obliquely elevated head rounded on its upper surface, the forward portion of the head lying in a plane oblique to the longitudinal axis of the body and configured to afford a frontal concavity having a margin of pear shaped configuration, the curvature of said concavity being interrupted by an abrupt cross ridge constituting an obstruction for limiting the angle of lift of the bait when being retrieved, and a hook secured to the body, substantially as described.

13. A bait comprising a body terminating at its forward end in an obliquely elevated head rounded on its upper surface, the forward portion of the head lying in a plane oblique to the longitudinal axis of the body and configured to afford a frontal concavity having a margin of pear shaped configuration, the curvature of said concavity being interrupted by an abrupt cross ridge constituting an obstruction for limiting the angle of lift of the bait when being retrieved, and a hook guard having the characteristics of a bucktail and adapted to co-act with the cross ridge in maintaining the desired angle for the bait while retrieving, substantially as described.

WILLIAM STANLEY.